(12) United States Patent
Politzer et al.

(10) Patent No.: US 7,683,884 B2
(45) Date of Patent: Mar. 23, 2010

(54) DEVICE FOR FACILITATING MAINTENANCE OF A TRACKBALL

(75) Inventors: David Politzer, Tours (FR); Jérôme Dufal, La Chaussee St Victor (FR); Nicolas Berthou, Aze (FR)

(73) Assignee: Thales (FR)

( * ) Notice: Subject to any disclaimer, the term of this patent is extended or adjusted under 35 U.S.C. 154(b) by 212 days.

(21) Appl. No.: 10/529,240

(22) PCT Filed: Oct. 10, 2003

(86) PCT No.: PCT/FR03/03003

§ 371 (c)(1),
(2), (4) Date: Mar. 25, 2005

(87) PCT Pub. No.: WO2004/038575

PCT Pub. Date: May 6, 2004

(65) Prior Publication Data

US 2006/0007156 A1    Jan. 12, 2006

(30) Foreign Application Priority Data

Oct. 18, 2002    (FR) .................................. 02 13005

(51) Int. Cl.
*G09G 5/08* (2006.01)
(52) U.S. Cl. ........................................ 345/167; 345/156
(58) Field of Classification Search ................. 345/167, 345/156

See application file for complete search history.

(56) References Cited

U.S. PATENT DOCUMENTS

| 5,252,790 | A | * | 10/1993 | Aime ........................... 187/387 |
| 5,252,970 | A | * | 10/1993 | Baronowsky ................. 341/20 |
| 5,486,845 | A | * | 1/1996 | Chait ........................... 345/163 |
| 5,734,374 | A | * | 3/1998 | Chambers .................... 345/167 |
| 6,429,852 | B1 | * | 8/2002 | Adams et al. ................ 345/163 |
| 6,525,714 | B1 | * | 2/2003 | Varga et al. .................. 345/164 |
| 6,680,728 | B1 | * | 1/2004 | Lilenfeld ..................... 345/156 |
| 6,950,093 | B2 | * | 9/2005 | Song ............................ 345/163 |
| 2002/0109674 | A1 | * | 8/2002 | Tada et al. .................... 345/167 |

FOREIGN PATENT DOCUMENTS

| FR | 02 00142 | 1/2002 |
| GB | 2 321 283 A | 7/1998 |
| JP | 2002 189562 A | 7/2002 |

* cited by examiner

*Primary Examiner*—Bipin Shalwala
*Assistant Examiner*—Afroza Y Chowdhury
(74) *Attorney, Agent, or Firm*—Lowe Hauptman Ham & Berner, LLP

(57) ABSTRACT

The invention relates to a device for facilitating maintenance of a trackball. The device comprises a trackball, a cover inside which the trackball is attached, the cover comprising an opening allowing a movable part of the trackball to appear in order to operate the movable part from outside the cover, the trackball comprising maintenance means. According to the invention, the device comprises means for gaining access to the means of maintaining the trackball from outside the cover.

15 Claims, 3 Drawing Sheets

DEVICE FOR FACILITATING MAINTENANCE OF A TRACKBALL

CROSS REFERENCE TO RELATED APPLICATIONS

The present Application is based on International Application No. PCT/FR2003/003003, filed on Oct. 10, 2003, which in turn corresponds to FR 02/13005 filed on Oct. 18, 2002, and priority is hereby claimed under 35 USC §119 based on these applications. Each of these applications are hereby incorporated by reference in their entirety into the present application.

FIELD OF THE INVENTION

The invention relates to a device for facilitating maintenance of a trackball. A trackball is an assembly comprising a fixed body and a movable part such as a sphere for example. The fixed part comprises sensors making it possible to deliver an item of information concerning the movement of the movable part. The invention applies particularly to a trackball belonging to an item of equipment mounted on board an aircraft. The trackball may then be used to select flight parameters. Generally in aeronautics, the onboard equipment must achieve a required level of reliability. This level is usually quantified by calculating a mean time between two failures. This time is known by the name "MTBF" (Mean Time Between Failure). It is a theoretical mean time between two failures requiring the equipment in question to be removed from the aircraft.

BACKGROUND OF THE INVENTION

Trackballs are sensitive to solid particles or liquids likely to pollute the surface of the movable part. Such pollution requires the equipment comprising the trackball to be removed which causes the mean time between two failures to fall. Several solutions may be envisaged to improve the reliability of an item of equipment comprising a trackball. An attempt has been made for example to improve the seal of the trackball itself. This seal is situated between the movable part and the fixed part of the trackball. Improving this seal requires a greater tightening of the seals. Tightening restricts the movement of the sphere relative to the body and causes jerky motions that are bad for its operation. Another solution consists in replacing mechanical elements rotating in contact with the sphere and used as sensors with optical sensors directly tracking the movement of the sphere. These optical sensors are less sensitive to pollutants but are of a more complex technology and tend to markedly increase the cost of the trackball.

SUMMARY OF THE INVENTION

The object of the invention is to increase the reliability of an item of equipment comprising a trackball without adversely affecting its operation or markedly increasing its production cost.

Accordingly, the subject of the invention is a device comprising a trackball, the trackball comprising a movable part, and a body inside which the movable part can move, the trackball delivering an item of information on the orientation of the movable part relative to the body, the device also comprising a cover inside which the trackball is attached, the cover being separate from the body and comprising an opening allowing the movable part of the trackball to appear in order to operate the movable part from outside the cover, the trackball comprising maintenance means, characterized in that the device comprises means for gaining access to the means of maintaining the trackball from outside the cover.

The invention has the advantage of allowing maintenance of the trackball without the obligation to remove from the aircraft the equipment that comprises it.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The invention will be better understood and other advantages will appear on reading the detailed description of an embodiment given as an example, the description being illustrated by the attached drawing in which:

FIGS. 1 and 2 represent the principle of the invention in simplified manner;

For the purposes of simplicity, the same elements will bear the same reference numbers in the various figures.

DETAILED DESCRIPTION OF THE INVENTION

Figure 1:
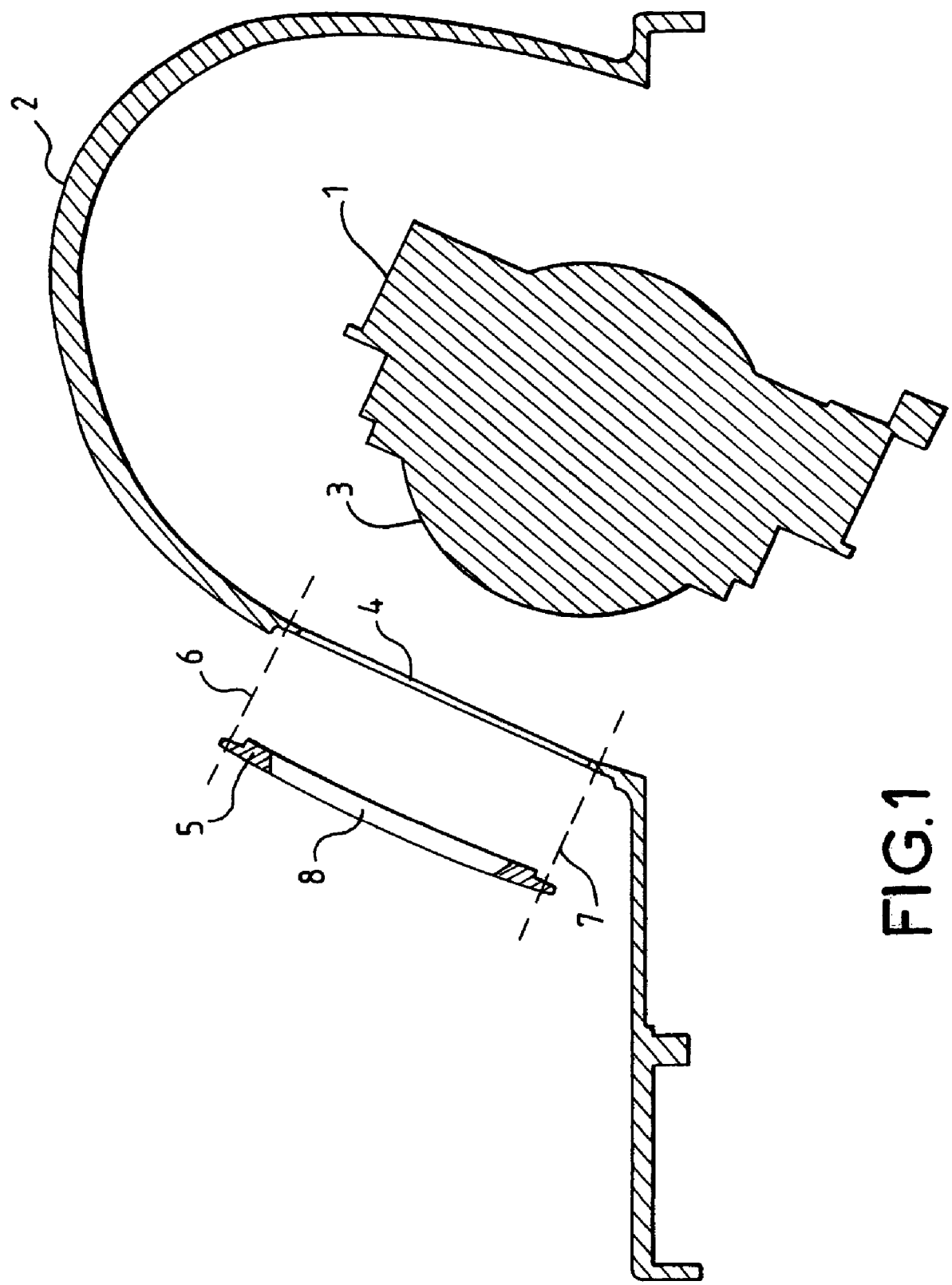
FIG. 1 represents an exploded view of a device according to the invention.

The device represented in FIG. 1 comprises a trackball 1 situated inside a cover 2. The cover 2 has, in this exemplary embodiment, an ergonomic shape allowing an operator to place the palm of the hand thereon. The operator keeps the fingers of the hand placed on the device free in order to move a movable part 3 of the trackball. The movable part 3 has the general shape of a sphere. The movable part 3 is operated by the operator from outside the cover 2. Accordingly, the cover 2 comprises an opening 4 allowing part of the movable part 3 to appear. The trackball comprises maintenance means making it possible in particular to clean the mechanical elements rotating about an axis and kept in contact with the movable part 3.

According to the invention, the device comprises means for gaining access to the means of maintaining the trackball 1 from outside the cover 2. More precisely, in the absence of these means, the opening 4 is adjusted so as to allow only a portion of the movable part 3 to appear. The adjustment is made so as to limit the possible penetration of liquid or solid particles inside the cover 2. The means for gaining access to the maintenance means allow a person responsible for the maintenance of the device to gain access to the maintenance means from outside the cover 2 by using a suitable tool such as for example a screwdriver without removing the whole of an item of equipment comprising the device.

Advantageously, the means for gaining access to the maintenance means comprise a window 5 removably attached to the body 2. More precisely, the removable attachment may be achieved by means of several screws only the axes 6 and 7 of which have been shown so as not to overcomplicate the figure. The screws may be made captive relative to the window 5.

To gain access to the maintenance means, it is not necessary to remove the trackball 1; it is sufficient to remove the window 5. The trackball 1 can be maintained even when the trackball 1 is attached to the cover 2.

Advantageously, the window 5 has the shape of a disk with a hole 8 therein forming the opening 4 of the cover 2. More precisely, the hole 8 has a shape matching the shape of the movable part 3 so as to limit the penetration of liquid or solid particles inside the cover 2. For example, if the movable part 3 is spherical, the hole 8 has an internal shape of a portion of a sphere of the same radius as that of the movable part 3.

Figure 2:
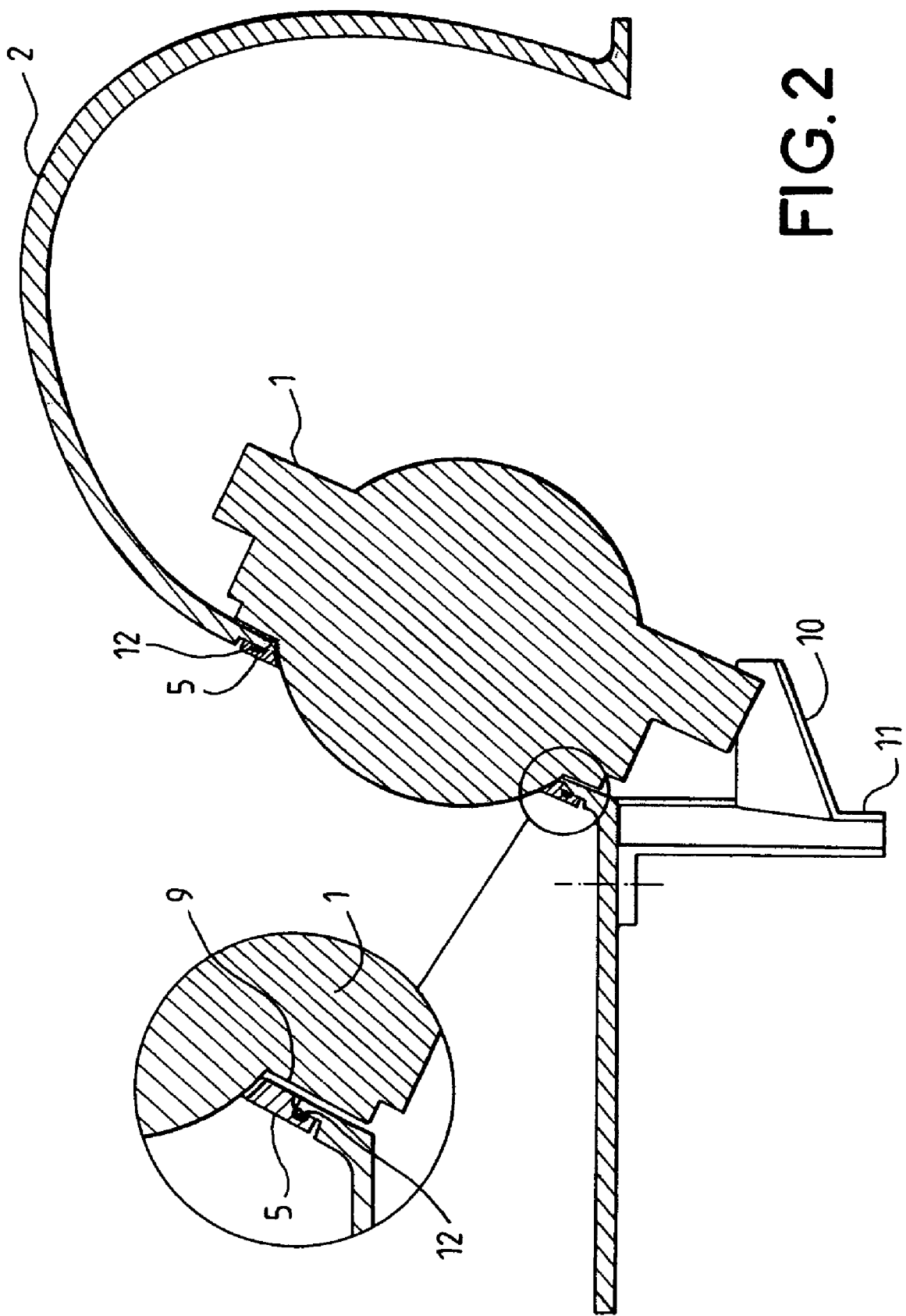
FIG. 2 represents an assembled view of the same device.

FIG. 2 represents the same elements as those represented in FIG. 1, that is to say the trackball 1 and its movable part 3, the cover 2 and the window 5. Unlike FIG. 1, the various elements are represented in assembled position. The device represented in FIG. 2 also comprises means of emptying out liquid or solid particles penetrating inside the cover 2 between the window 5 and the trackball 1. The emptying means comprise a clearance 9 situated between the cover 2 and the window 5 on the one hand and the trackball 1 on the other hand. The emptying means also comprise a collector 10 collecting all the particles penetrating inside the cover 2 via the clearance 9. The emptying means also comprise a pipe 11 allowing the removal of the particles present in the collector 10. Advantageously a seal 12 is provided between the window 5 and the cover 2. The seal 12 takes the form of an O-ring.

Figure 3:
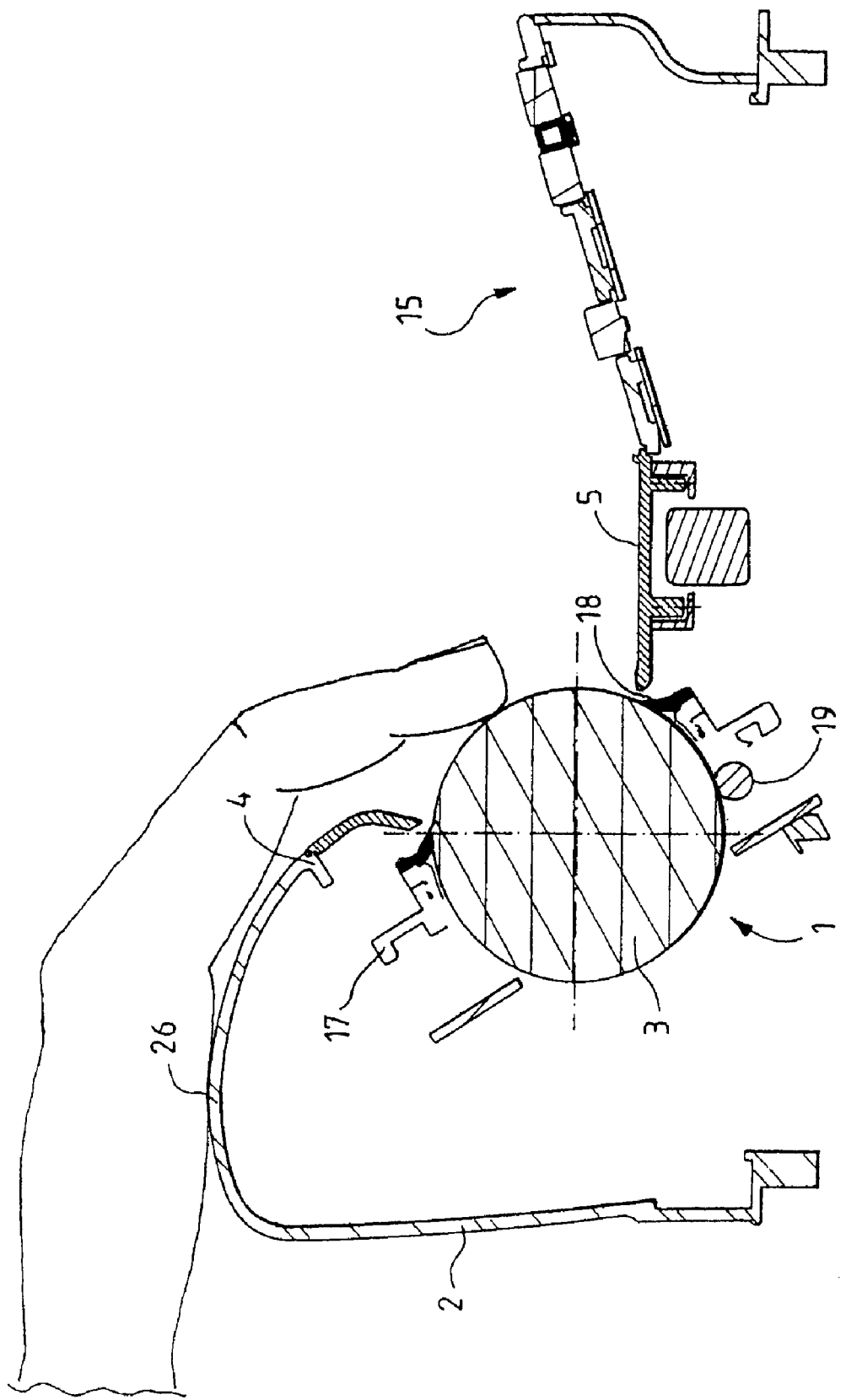
FIG. 3 represents an exemplary embodiment of a device according to the invention.

FIG. 3 represents an item of equipment of an aircraft instrument panel. This item of equipment allows the aircraft pilot to enter data relating to the flight parameters of the aircraft. The equipment comprises a keyboard 15 and the trackball 1 mounted in the cover 2. A top portion 16 of the cover 2 allows the pilot to place the palm of the hand thereon. The top portion 16, also called the palm-rest, allows the pilot to steady his hand so that the data entry, particularly with the aid of the trackball, is carried out with precision. The usefulness of the palm-rest can be understood because of the vibrations that exist in the aircraft when it is in flight. The item of equipment represented in FIG. 3 is usually installed beside the aircraft pilot's seat and the pilot extends his arm downward to place the hand on the palm-rest and operate the keyboard and/or the trackball. This low position of the equipment in the aircraft cockpit makes the equipment sensitive to the risk of penetration of particles, particularly liquid, likely to be deposited on the palm-rest 16.

The equipment comprises the window 6 for example attached to the cover 2 by captive screws or clips. Inside the aircraft, the window 6 can be removed to gain access to the trackball 1. The trackball 1 comprises a body 17 forming a fixed part of the trackball 1 and attached to the equipment and a sphere forming the movable part 3 of the trackball 1. The body 17 is separate from the cover 2.

When it is necessary to maintain the trackball, the window 5 is removed to allow access to means of maintaining the trackball 1.

The trackball 1 comprises a ring 18 attached to the body 17 and preventing the movable part 3 from losing contact with the body 17. The maintenance means comprise for example the ring 18 in which a seal is placed. The ring 18 is attached to the body 17. When the window 5 has been removed, it is possible to remove the ring 18, then the sphere 3. This removal provides access to the mechanical elements 19 rotating in contact with the sphere 3 and used as sensors of the movement of the sphere 3. The mechanical elements 19 comprise, for example, two rollers whose axes are perpendicular and which are used to determine the movements of the sphere 3 along the two axes. These rollers are particularly sensitive to the particles entering the trackball 1 and being deposited thereon. Maintenance of the trackball consists essentially in cleaning these rollers and where necessary in filling the seal belonging to the ring 18.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A device, comprising:
a trackball, the trackball having a movable part, and
a body inside which the movable part can move, the trackball delivering an item of information on the orientation of the movable part relative to the body,
a ring attached to the body end preventing the movable part from losing contact with the body, and a seal placed in the ring,
the device also comprising a cover inside which the trackball is attached, the cover being separate from the body and comprising an opening allowing the movable part of the trackball to appear in order to operate the movable part from outside the cover, the ring forming maintenance means of the trackball, the maintenance means comprising means for gaining access to the maintenance means from outside the cover, in that the means for gaining access to the maintenance means comprises a window removably attached to the cover so as to gain access to the maintenance means by removing the window and without removing the trackball from the cover, the cover having a portion configured for an operator to rest a palm of a hand thereon in a manner wherein the palm is ergonomically supported and wherein fingers of the hand are free to engage the movable part of the trackball.

2. The device as claimed in claim 1, wherein the window has the shape of a disk with a hole therein and in that the hole forms the opening of the cover.

3. The device as claimed in claim 2, wherein the hole has a shape matching the shape of the movable part so as to limit the penetration of particles inside the cover.

4. The device as claimed in claim 1, further comprising means of emptying out particles penetrating inside the cover between the window and the trackball.

5. The device as claimed in claim 4, wherein the emptying means comprise a collector collecting all the particles.

6. The device as claimed in claim 2, further comprising means of emptying out particles penetrating inside the cover between the window and the trackball.

7. The device as claimed in claim 3, further comprising means of emptying out particles penetrating inside the cover between the window and the trackball.

8. The device as claimed in claim 3, wherein the trackball comprises a ring attached to the body and preventing the movable part from losing contact with the body.

9. The device as claimed in claim 4, wherein the trackball comprises a ring attached to the body and preventing the movable part from losing contact with the body.

10. The device as claimed in claim 5, wherein the trackball comprises a ring attached to the body and preventing the movable part from losing contact with the body.

11. The device as claimed in claim 1, wherein a ring, which is separate from the window, is attached to the body and is configured to prevent the movable part from losing contact with the body.

12. The device as claimed in claim 1, wherein the movable element is a ball.

13. The device as claimed in claim 1, wherein the window comprises a disk in which the opening through which a portion of the movable part of the trackball is exposed, is formed.

14. The device as claimed in claim 1, wherein the trackball forms part of an aircraft instrument panel.

15. The device as claimed in claim 11, wherein the ring belongs to the maintenance means.

* * * * *